June 10, 1958 A. THOMAS ET AL 2,838,227
PREVENTING OR REDUCING STALLING OF THE EARLY ROWS OF
AXIAL-FLOW COMPRESSOR BLADES OF GAS TURBINE ENGINES
Filed Dec. 9, 1954 5 Sheets-Sheet 1

United States Patent Office 2,838,227
Patented June 10, 1958

2,838,227

PREVENTING OR REDUCING STALLING OF THE EARLY ROWS OF AXIAL-FLOW COMPRESSOR BLADES OF GAS TURBINE ENGINES

Albert Thomas and John Marlow, Coventry, England, assignors to Armstrong Siddeley Motors Limited, Coventry, England Application December 9, 1954, Serial No. 474,258

Claims priority, application Great Britain December 23, 1953

4 Claims. (Cl. 230—114)

This invention relates to a gas turbine engine such as has an axial-flow compressor.

With such an engine, it is well-known that there is a tendency for the early rows of the compressor blades (after the inlet guide vanes) to stall when operating at speeds, below the designed speed, at which the mean axial velocity of the air through the compressor is considerably reduced.

From experiments it is now concluded that the stalling of an early row of axial-flow compressor blades contributes to blade vibration or flutter, particularly in the case of the first blade row of the rotor, and that this blade flutter sometimes reaches such a high amplitude that the blades of the row become stressed to the fracture point, thus damaging the engine.

It is the main object of the invention to reduce stalling in the early blade rows of an axial-flow compressor of a gas turbine engine.

The invention broadly consists in providing a plurality of overlapping shutters pivotally mounted at their upstream ends upstream of the compressor and resiliently biased against the direction of the airstream so as to extend into and to blank off an inner annular portion of the compressor air intake, the shutters being movable about their respective pivotal axes against the bias and in response to increasing engine speed to decrease the area of the portion blanked off.

The shutters are preferably brought into operation at engine speeds at which stalling flutter of an early blade row of the compressor might otherwise occur.

One embodiment of the invention is hereinafter particularly described with reference to the accompanying drawings, in which.

Figure 6:
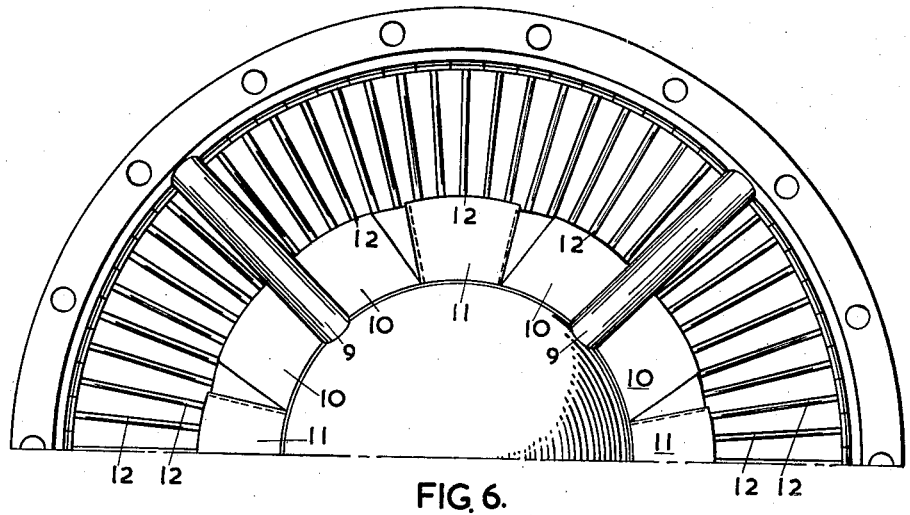
Figure 6 is an enlarged end elevation of the upper half of the compressor intake seen in the direction of the arrow 6 of Figure 5 the shutters being fully open.
Figure 7:
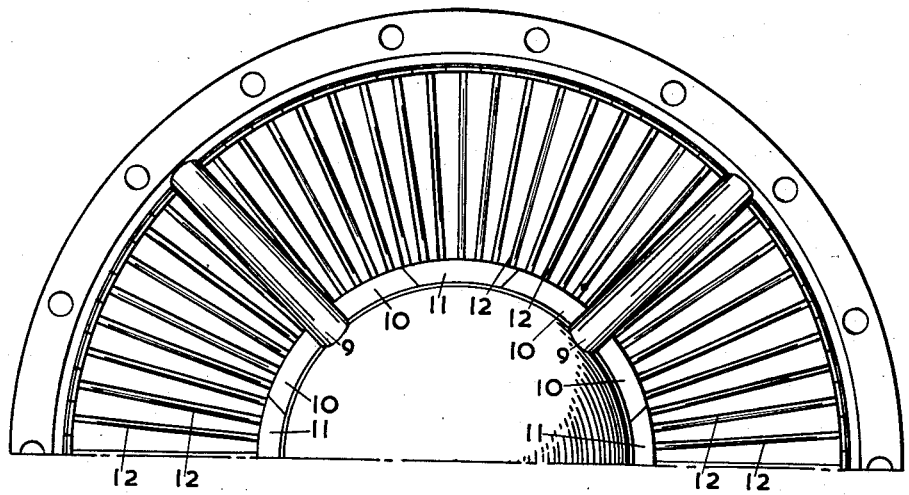
Figure 7 is a corresponding end elevation with the shutters fully closed.

Although only half the compressor intake is shown in Figures 6 and 7 it is to be understood that the other half is similar, the four aerofoil struts 9 being arranged symmetrically around the intake.

Figure 1:
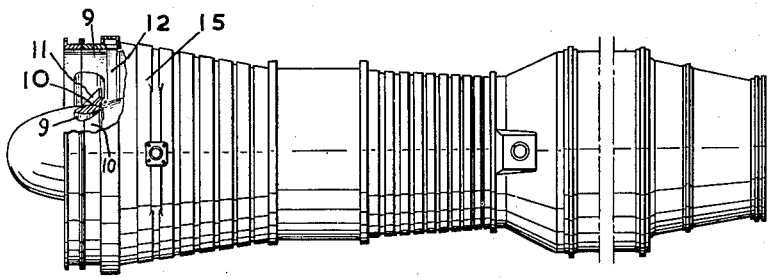
Figure 1 is a side elevation of a gas turbine engine, part of the compressor intake being broken away to show the shutters of this invention.

The gas turbine engine shown in Figure 1 is of conventional form except that adjacent the axial compressor 15 is a plurality of overlapping arcuate shutters 10, 11, disposed so that their downstream ends, in the inoperative position, are adjacent the radially-inner ends of compressor inlet guide vanes 12. The shutters 10, 11 are adapted, when moved to their inoperative positions (Figures 2, 3 and 7), to form a continuation of a radially-inner wall 13 (Figure 3) of the inlet passage 14 of the axial compressor 15; and the shutters are adapted when moved to their fully operative positions to form a substantially truncated cone (Figures 1, 5 and 6) so as to blank off an inner annular portion of the compressor intake.

The shutters 10, 11, each of the necessary part-concial contour (Figures 5 and 6), are mounted on pivot pins 16 at the upstream edges of the shutters 10, 11. The shutters 10, 11 overlap at 17, 18 respectively and beneath the shutters 10, 11 is a stationary guard 19 to prevent any parts which may become detached flying into the compressor intake. The shutters 10, 11 are arranged in groups of three between radially arranged aerofoil struts 9 forming the connecting means between the inner and outer walls of the inlet passage.

Figure 2:
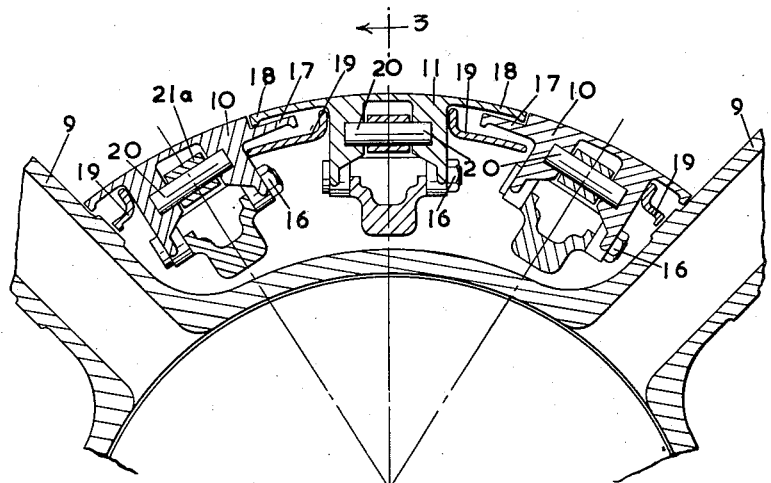
Figure 2 is a cross-section on line II—II of Figure 3 through part of the compressor intake showing the mounting of the shutters.

It is desirable that the outer edges of the shutters 10 are maintained as close as possible to the struts 9 during operation of the shutters and this is achieved by arranging the pivot pins 16 as shown in Figure 2.

Thus, the two outer shutters 10 have their pivot pins 16 set at a small angle to the radius of the compressor casing and the central shutter 11 has its pivot pin 16 normal to the radius of the compressor casing.

In other words the pivot pins of the outer shutters 10 are each tangential to a circle drawn with centre offset from the centre of the circle corresponding to the compressor casing. As shown in Figure 2 the centres corresponding to the shutters 10 are oppositely off-set.

Thus, when the shutters 10 are being operated their outer edges maintain a close relationship with the aerofoil-section struts 9, and the overlapping (Figures 5 and 6) of the shutters 10, 11 also ensures a substantially continuous blanking-off of an inner annular portion of the intake when they are raised to their fully operative positions (for example, through an angle of 35°).

Pivoted to each shutter 10, 11 by a pin 20 is a link 21a (Figures 2 and 3) which is in turn pivotally connected at 21b to a piston 21 slidable in a cylinder 22. Between one end of the cylinder 22 and the piston 21 is formed a chamber 23 to which oil under pressure can be supplied, and between the other end of the cylinder 22 and the piston 21 are three coaxial coil springs 24, 25, 26 shown in their compressed state.

Figure 3:
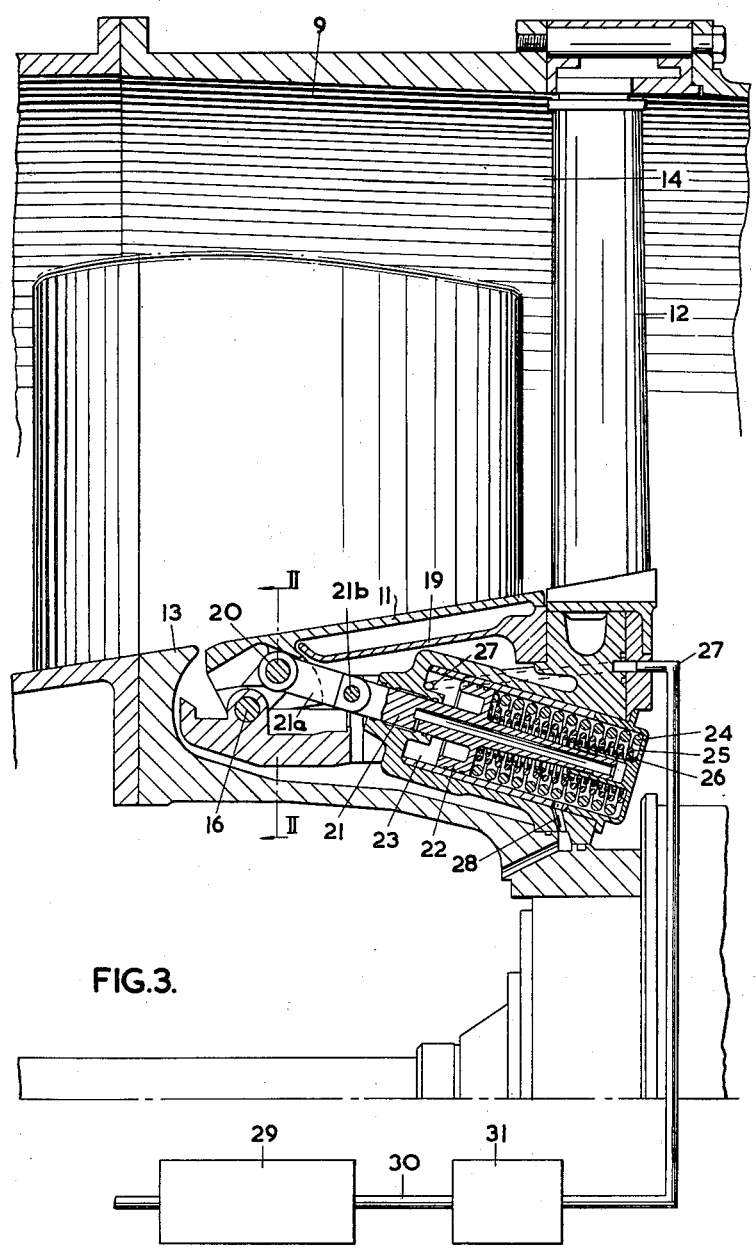
Figure 3 is an axial section on line 3—3 of Figure 2, partly diagrammatic, showing the operating mechanism of a shutter.
Figure 5:
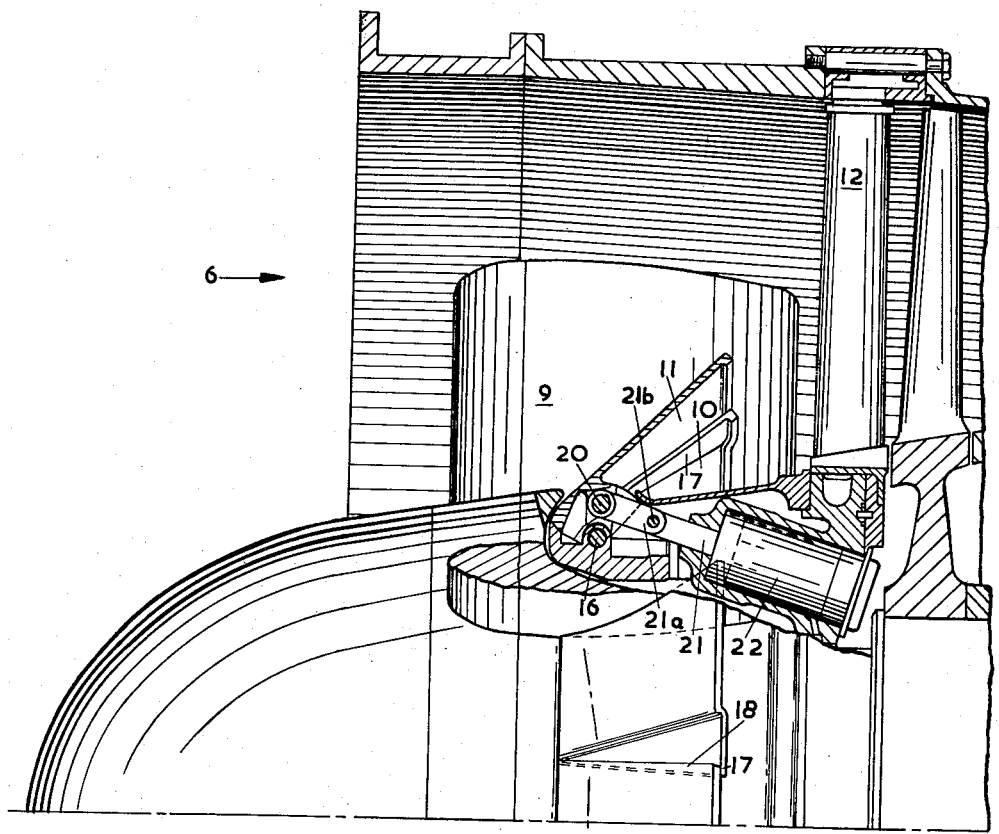
Figure 5 is an enlarged sectional elevation of a portion of the compressor intake and associated parts shown in Figure 1.

The coil springs 24, 25, 26 resiliently bias the associated shutters 10 and 11, against the airstream to their operative positions (as shown in Figures 5 and 6); the shutters 10, 11 being moved to their inoperative positions (as shown in Figures 2, 3 and 7) by oil pressure supplied to the chamber 23 through a passage 27. The part of the cylinder 22 containing the coil springs is vented at 28.

The operating mechanism for the shutters is disposed, as shown in Figure 3, in the nose of the compressor. The arrangement is such that the line of thrust of each spring, when the shutter is in its operative position, is substantially at right-angles to the shutter.

The oil under pressure supplied to chamber 23 is derived from any suitable source such as an engine-driven oil pump, which is not shown, as the source of the pressure is immaterial to the invention.

The oil is supplied to a pressure accumulator 29 (Figure 3) and thence through a pipe 30 to a governor-operated valve 31 so that the movement of the piston 21 is controlled in accordance with engine speed.

Figure 4:
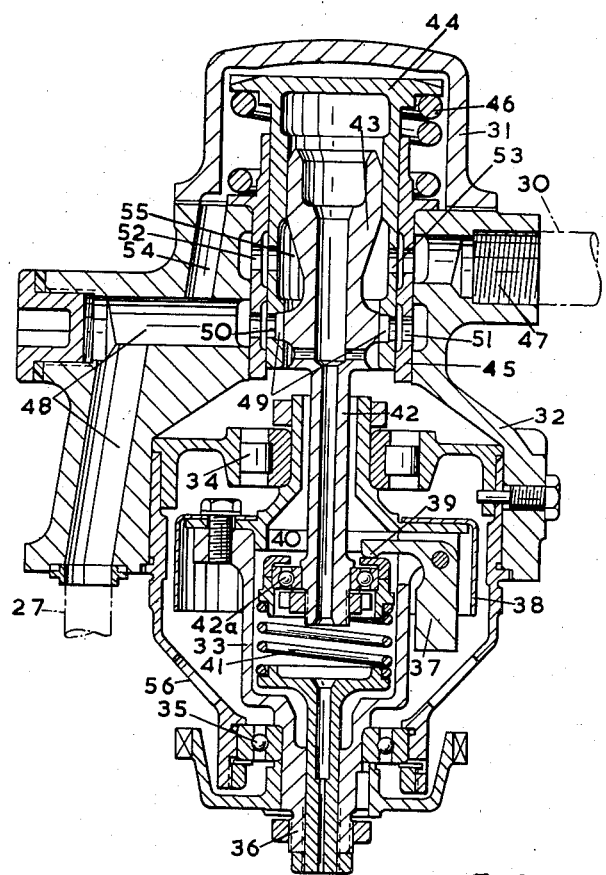
Figure 4 is a section through a governor-operated valve mechanism shown as a block in Figure 3.

The governor-operated valve 31 comprises a casing 32 (Figure 4) in which a governor body 33 is rotatably supported on bearings 34, 35. The governor body 33 has a shaft 36 which extends through the casing 32 and is adapted to be driven from a suitable drive on the gas turbine engine. On the governor body are pivotally mounted three governor weights 37 (only one of which is shown) the weights 37 being limited in their outward movement by a guard 38. The weights have operating arms 39 adapted to contact an abutment 40. Between the abutment 40 and an adjustable member within the governor body 33 is a coil spring 41; and a shaft 42, of a slidable valve member 43, is supported in bearings 42a in the abutment 40.

The valve member 43 is slidable in an external slidable sleeve acting as a follow-up piston 44. Between the head of piston 44 and a stationary valve sleeve 45 is a coil spring 46.

The casing 32 has an oil inlet 47 to which is fixed one end of pipe 30 and an oil outlet 48 to which is fixed one end of pipe 27. The governor mechanism is shown in its inoperative position, the valve member 43 having a land 49 which closes passages 50, 51 which are continuously in registration in the piston 44 and valve sleeve 45 respectively. The passages 50 and 51 communicate with the outlet 48.

There are also further registering passages 52, 53 in the valve sleeve 45 and piston 44 respectively, and these passages are in communication with the inlet 47, the passages 52 and 50 being interconnected (when the valve is open) by an annular passage 55 formed between the head of the valve 43 and the inner wall of the piston 44. The oil outlet 48 is connected by a passage 54 to the space between the head of piston 44 and the casing 32.

The operation of the shutters 10, 11, is as follows:

When the gas turbine engine is inoperative and at all speeds below a predetermined speed, say 6,500 R. P. M., each of the shutters 10, 11 is held in its operative position at approximately 35° to the longitudinal axis of the compressor by pressure of the three springs 24, 25, 26 acting through the piston 21 and link 21a, as shown in Figure 3.

When the speed of the engine rises above 6,500 R. P. M. the pressure on the abutment 40 of the operating arms 39, as the weights 37 are swung outwardly, overcomes the pressure of coil spring 41 so that the valve member 43 slides longitudinally (downwardly in Figure 4) of the governor valve mechanism to open passages 50, 51 and allow oil under pressure to pass from the oil inlet 47 through the passages 52, 53 and the annular passage 55 and thence through passages 50 and 51 into the oil outlet 48. The oil under pressure flows through the passage 27 into all of the chambers 23 thereby causing the pistons 21 to move (to the right in Figure 3) to close the shutters 10 and 11 towards the inoperative position. The pressure supplied to the chambers 23 will be opposed by the springs 24, 25, 26 and an equilibrium position will be reached at which the shutters will be at some intermediate position according to the engine speed. The oil flowing through the outlet passage 48 will also flow through the passage 54 to the head of the piston 44 causing the piston to move (downwardly in Figure 4) against the pressure of spring 46 until the said equilibrium is reached when passages 50 in the piston 44 will be closed by the land 49, thereby cutting off communication between the passage 51 and the annular passage 55 thus sealing the system with the shutters at some predetermined position.

As long as the engine speed remains constant the shutters will remain in this position but if the engine speed rises say to 7,000 R. P. M., the valve member 43 will again move to open passages 50 and more oil will flow through the valve to move the shutters finally to their inoperative position; or if the speed rises to some intermediate value the shutters will take up a corresponding intermediate position.

Again the piston 44 will act as a follow-up piston to close the valve thereby holding the shutters in their new position.

Thus it is seen that with the mechanism above-described the governor-operated valve causes the shutters to take up and hold a position in dependence upon engine speed.

If the engine speed falls while the shutters are in any position other than their fully operative position, the valve member 43 moves (upwardly in Figure 4) to open passages 50, 51 and allow oil to flow out of all the chambers 23, through passages 50, 51 into the casing 32. The oil flows out of the casing through an aperture 56 to a sump (not shown). The piston 44 moves upwardly, because of the reduced pressure acting on the head of the piston, until an equilibrium position is reached when passage 50 is closed by land 49. The shutters thus take up a position nearer to their fully operative position.

It is considered advisable that the downstream edges of the shutters (when in the inoperative position) should extend closely towards the roots of the inlet guide vanes. Placing the shutters further upstream, as may be necessary in some conditions, may require that the shutters will rise to greater heights when in the operative positions if satisfactory blanking of the air intake is to be provided, such as will prevent stalling flutter from occurring in any of the early rows of blades.

By reducing or preventing stalling of the early rows of the compressor blades, blade vibration or flutter can be prevented and thus fracture of the blades.

Furthermore, it is considered that the improvement in the stability and acceleration of the engine arising from the invention will be such that variable stagger inlet guide vanes, which have hitherto been proposed for this purpose, may not be necessary.

What we claim as our invention and desire to secure by Letters Patent of the United States is:

1. In a gas turbine engine having an axial-flow compressor and a compressor air intake, a plurality of overlapping shutters pivotally mounted at their upstream ends upstream of the compressor, resilient biassing means acting on said shutters to move them against the direction of the airstream, the shutters extending into the compressor air intake to blank off a continuous inner annular portion only of the compressor air intake, a hydraulic piston and cylinder arrangement for each shutter, a respective link connecting each shutter with its piston and cylinder arrangement, a hydraulic pressure source, a valve adapted to control the application of hydraulic pressure from said source to said piston and cylinder arrangements, and a governor mechanism driven from the engine, said governor mechanism adapted to operate said valve for varying the hydraulic pressure applied to said piston and cylinder arrangements for moving said shutters about their respective pivot axes against the bias and in response to increasing engine speed to decrease the area of the annular portion blanked-off.

2. In a gas turbine engine the structure, according to claim 1 in which the resilient biassing means comprises, for each shutter, at least one coil spring acting on a piston movable in a cylinder, the piston being connected by a link to the shutter.

3. In a gas turbine engine having an axial flow compressor, a compressor air intake passage having an inner wall, a number of aerofoil struts extending across the compressor air intake passage and a plurality of overlapping shutters pivoted on said inner wall and disposed in groups between the aerofoil section struts, each of the shutters being of part conical shape, means for holding the shutters in inoperative positions to form a continuation of the inner wall of the intake passage, and means for moving the shutters to operative positions to form a substantially truncated cone to blank-off a continuous inner annular portion only of the compressor air intake, the pivotal axis of each of the shutters adjacent the aerofoil section struts being at a small angle to a tangent to a circle corresponding to the compressor casing, the axes of the two shutters on opposite sides of each strut being inclined one to the other.

4. In a gas turbine having an axial flow compressor, a compressor air intake passage having an inner wall, a number of aerofoil struts extending across the compressor air intake passage and a plurality of overlapping shutters pivotally disposed in groups between the aerofoil section struts, each of the shutters being of part conical shape, hydraulic means to move the shutters about their pivotal axes towards inoperative positions in which they form a continuation of the inner wall of the intake passage, and resilient biassing means acting on the shutters to move them about their pivotal axes towards operative positions in which they form a substantially truncated cone to blank off a continuous annular portion only of the compressor air intake, the hydraulic means comprising an engine-governor-operated valve which includes a valve member reciprocable in a valve casing, and which also includes a follow-up mechanism comprising a sleeve-like spring-pressed follow-up piston slidable on the valve member, the piston having radial passages and the valve casing having inlet and outlet passages so that fluid flows through the valve only when the piston and valve member are in such positions as to interconnect the inlet and outlet passages through the radial passages.

References Cited in the file of this patent

UNITED STATES PATENTS

| | | |
|---|---|---|
| 212,004 | Hunsinger | Feb. 4, 1879 |
| 2,083,447 | Hoffmann | June 8, 1937 |
| 2,613,029 | Wilde | Oct. 7, 1952 |
| 2,689,680 | Lovesey | Sept. 21, 1954 |

FOREIGN PATENTS

| | | |
|---|---|---|
| 78,432 | Austria | Sept. 25, 1919 |
| 692,355 | Great Britain | June 3, 1953 |
| 1,010,604 | France | Mar. 26, 1952 |